United States Patent
Mortensen (10) Patent No.: US 11,190,674 B2
(45) Date of Patent: Nov. 30, 2021

(54) REMOTE CAMERA TRIGGER

(71) Applicant: John Robert Mortensen, Green Bay, WI (US)

(72) Inventor: John Robert Mortensen, Green Bay, WI (US)

(*) Notice: Subject to any disclaimer, the term of this patent is extended or adjusted under 35 U.S.C. 154(b) by 45 days.

(21) Appl. No.: 16/561,753

(22) Filed: Sep. 5, 2019

(65) Prior Publication Data

US 2020/0084364 A1  Mar. 12, 2020

Related U.S. Application Data

(60) Provisional application No. 62/728,216, filed on Sep. 7, 2018.

(51) Int. Cl.
*H04N 5/232* (2006.01)
*H04N 5/225* (2006.01)
*H04N 1/00* (2006.01)

(52) U.S. Cl.
CPC ......... *H04N 5/23203* (2013.01); *H04N 5/225* (2013.01); *H04N 5/23218* (2018.08); *H04N 1/00127* (2013.01)

(58) Field of Classification Search
CPC ........... H04N 5/23203; H04N 5/23218; H04N 5/225; H04N 5/2324; H04N 1/00127
See application file for complete search history.

(56) References Cited

U.S. PATENT DOCUMENTS

| | | | | |
|---|---|---|---|---|
| 5,561,492 A | * | 10/1996 | Ohsawa | G03B 17/38 396/121 |
| 9,325,909 B2 | | 4/2016 | Kasahara | |
| 9,785,335 B2 | | 10/2017 | Oh | |
| 2003/0174242 A1 | * | 9/2003 | Carmi | H04N 5/2354 348/376 |
| 2009/0190916 A1 | * | 7/2009 | Sharp | G03B 17/02 396/425 |
| 2010/0138797 A1 | * | 6/2010 | Thorn | G06F 3/017 715/863 |
| 2015/0002391 A1 | * | 1/2015 | Chen | H04N 5/23293 345/156 |
| 2018/0011619 A1 | | 1/2018 | Oh | |
| 2019/0289198 A1 | * | 9/2019 | Bosworth | G06F 3/017 |

OTHER PUBLICATIONS

Pluto Trigger, High-Speed Remote Camera Shutter, taken from plutotrigger.com/products/pluto-trigger via Wayback Machine internet archive, dated Oct. 22, 2018, 10 pages.

* cited by examiner

*Primary Examiner* — Hung H Lam
(74) *Attorney, Agent, or Firm* — Foley & Lardner LLP (57) ABSTRACT

This disclosure provides a method and apparatus for controlling a camera to take a photograph. More specifically, a remote that includes a processor and a proximity sensor connected to the micro-processor. The remote also includes a housing and is designed to communicably couple to a camera. The remote is configured to cause the camera to focus in response to sensing a first gesture and to cause the camera to take a photograph in response to sensing a second gesture. In some embodiments, the first and second gestures are touchless.

20 Claims, 6 Drawing Sheets

REMOTE CAMERA TRIGGER

CROSS-REFERENCE TO RELATED PATENT APPLICATIONS

This application claims the benefit of Provisional Application No. 62/728,216, filed Sep. 7, 2018, which is incorporated herein by reference in its entirety.

FIELD

The present application relates generally to the field of cameras, and more particularly to a remote camera trigger.

BACKGROUND

The following description is provided to assist the understanding of the reader. None of the information provided or references cited are admitted to be prior art.

Cameras require a user to physically apply a force to a button, trigger, or remote in order to operate the camera. Most cameras have at least one button for taking pictures. Some cameras require a user to push the button down half way in order to focus the camera and fully press the button down in order to signal to the camera to take the photo and create an image. However, the physical application is an issue in situations where a physical disruption or movement of the camera or environment around the camera may cause a blurry or unstable image of the item being photographed. Further, the application of physical force may become tedious or otherwise cumbersome in applications where multiple, repetitious photographs need to be taken.

SUMMARY

A system for taking a photograph is disclosed. The system includes a camera, and a remote communicably coupled to the camera. The remote includes a micro-processor and a proximity sensor connected to the micro-processor. The remote is configured to focus the camera in response to sensing a first gesture and to cause the camera to take a photo in response to sensing a second gesture. The first gesture and second gesture are touchless gestures. In some embodiments, sensing the first gesture includes sensing an object at a first proximity from the proximity sensor, and sensing the second gesture includes sensing the object at a second proximity from the proximity sensor that is less than the first proximity. In some embodiments, the object may be a hand or foot of a user.

In another implementation, a remote for controlling a camera is disclosed. The remote includes a micro-processor and a proximity sensor connected to the micro-processor. The remote is configured to cause the camera to focus in response to sensing a first gesture and to cause the camera to take a photograph in response to sensing a second gesture. In some embodiments, the first gesture and the second gesture are touchless. In some embodiments, sensing the first gesture comprises sensing an object at a first proximity by the proximity sensor, and sensing the second gesture comprises sensing the object at a second proximity by the proximity sensor.

In some embodiments, the remote further includes a second proximity sensor communicably coupled to the micro-processor, where the second proximity sensor positioned in a different direction than the proximity sensor. In some embodiments, sensing the first gesture includes sensing an object at a first proximity by the proximity sensor, and sensing the second gesture includes sensing the object at a second proximity by the second proximity sensor.

In some embodiments, the remote further includes an indication light communicably coupled to the microprocessor, the indication light configured to illuminate in a first color in response to the camera being on, illuminate in a second color in response to the camera being focused, and to turn off before the photograph is taken. The first color may be green, and the second color may be red.

In another implementation, a method of taking a photograph is disclosed. The method includes sensing, by a remote, a first gesture, wherein the first gesture is touchless, transmitting, by the remote, a first signal to a camera, the first signal configured to cause the camera to focus, sensing, by the remote, a second gesture; and transmitting, by the remote, a second signal to the camera, the second signal configured to cause the camera to take the photograph. In some embodiments, sensing the first gesture includes sensing an object at a first proximity by a first proximity sensor. In some embodiments, sensing the second gesture includes sensing the object at a second proximity by the first proximity sensor. In some embodiments, the method further includes, in response to receiving, by the remote, a third signal from the camera, illuminating an indication light in a first color, wherein the third signal is indicative that the camera is focused, and in response to sensing the second gesture, turning off the indication light before transmitting the second signal.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are various embodiments of a remote for controlling a camera. The remote includes a housing, a processor, and a proximity sensor. The processor is disposed within the housing. The proximity sensor is mounted on the housing, communicably coupled to the processor, and senses a portion of an environment outside of the housing. The proximity sensor senses the portion of the environment outside of the housing for gestures. A gesture may include an object (e.g., hand, wand, foot, tool, shoe, glove, etc.) placed at one of multiple proximities from the sensor. For example, a hand may be placed at a distance of 12 inches from the proximity sensor, the remote may register this as a first gesture. In response to sensing the first gesture, the remote (e.g., processor) generates a first signal and transmits the first signal to a camera. The first signal causes the camera to focus on objects within a field of view (FOV) of the camera. In some embodiments, the camera may signal when the camera is focused. For example, in some embodiments, the remote may include an indication light (e.g., a light emitting diode (LED), or multiple lights) on the housing. The camera may send a second signal to the remote after the camera has focused, and in response, the remote may illuminate the light in a first color (or first pattern) that is configured to signal to a user that the camera is focused. The user may then move the object (e.g., perform a second gesture). The remote senses the second gesture and generates and transmits a third signal to the camera. The third signal may cause the camera to take a photograph. In some embodiments, the remote turns off the light before transmitting the third signal to ensure that the light does not interfere with the photograph (e.g., the corresponding image to the photograph). Thus, the remote allows for zero contact (e.g., touchless) operation of a camera. In this way, the remote can be used in highly sensitive applications where any user interference (e.g., touching) with the camera, remote, or pieces being photographed can cause imperfections in the image.

For example, in one particular application, the remote allows for a user (e.g., a museum curator or historical preservationist) to take high quality photographs of artifacts, art, or other historical documents or items in order to reliably preserve all of the information implicitly and explicitly held by such items. Particularly, the user may place an item (e.g., a painting or artifact) in a mounted camera's field of view and motion his/her hand to a first position relative to the remote in order to signal to the remote to cause the camera to focus. The remote may indicate to the user via an indication (e.g., a light) when the camera is focused. The user may then motion his/her hand to a second position relative to the remote in order to signal to the remote to signal the camera to take the photograph. In this way, the user does not disrupt the camera or the items being photographed during the process of taking the photograph, thus ensuring that a maximum amount of detail of the item is captured in the image. The user may then remove the item and place a second item in the camera's field of view.

Various embodiments of a camera system including a remote are illustrated throughout FIGS. 1 through 9. The remote may include one, two, three, four or more proximity sensors. It should be appreciated that the remote disclosed herein is not limited by any physical interface, type of processor, type of proximity sensor, or shape described.

Figure 1:
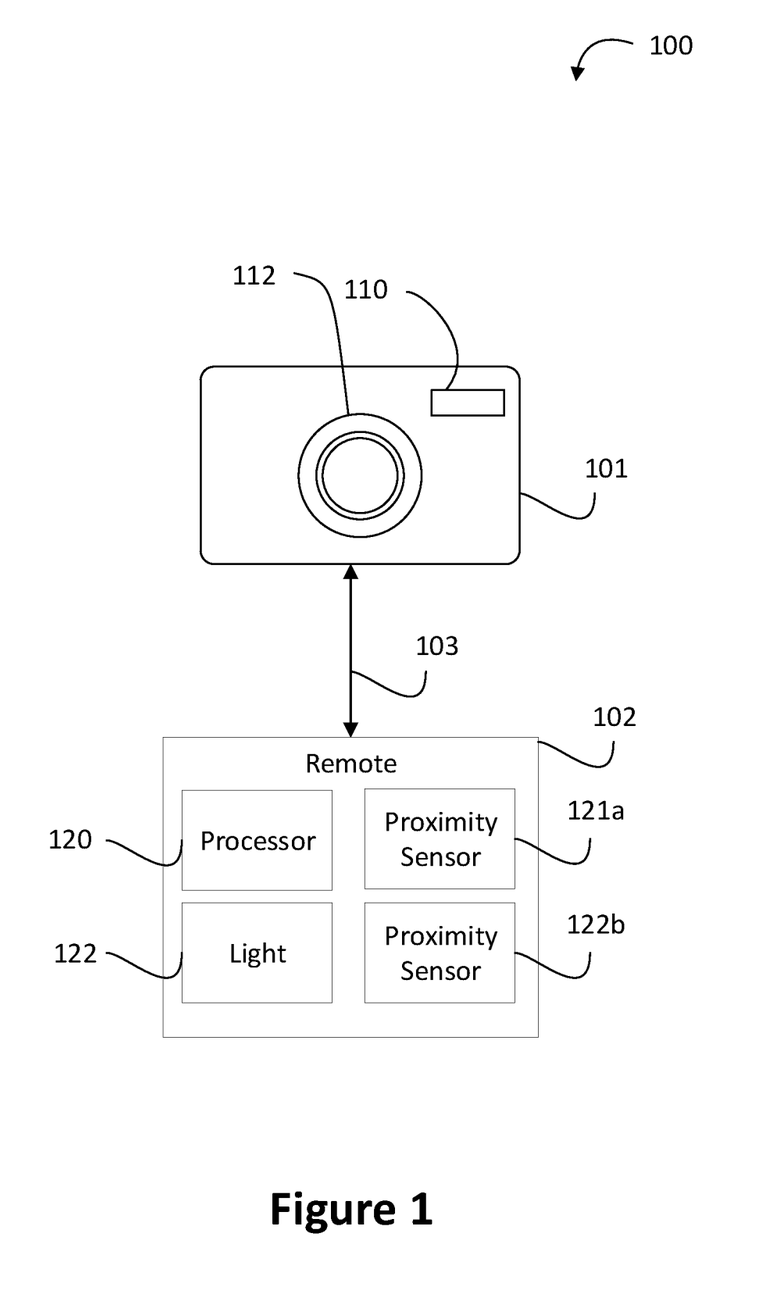
FIG. 1 depicts a block diagram of a system for taking a photograph in accordance with an illustrative embodiment.

FIG. 1 depicts a block diagram of a system for taking a photograph 100 in accordance with an illustrative embodiment. The system for taking a photograph 100 includes a camera 101, a remote 102, and a communication link 103. In some embodiments, the camera 101 is integrated into a smart phone or other smart device. In some embodiments, the camera 101 is a digital camera. In some embodiments the camera is an analog camera. The camera 101 includes a lens system 112. The lens system 112 may include one or more motors or actuators (not depicted) configured to adjust the lens system 112 in order to focus the camera within a field of view (FOV). The FOV is the area of the external environment that is imaged when the camera takes a photograph. In some embodiments, the camera 101 includes a flash 110. The flash 110 may be integrated into the camera or a system that is communicably coupled to the camera 101. "Communicably coupled" is defined herein to include any wired, wireless, or combination of wired and wireless communication systems or protocols between two or more devices.

In some embodiments, the communication link 103 between the camera 101 and the remote 102 may be a wired connection (e.g., via a cable) between the camera 101 and the remote 102. In some embodiments, the communication link 103 may be wireless communication link. For example, the wireless communication link may include Bluetooth, Wi-Fi, a cellular network, near field communication, internet, or a combination thereof. In some embodiments, the remote 102 communication link 103 may be a combination of a wired and wireless communication. For example, in some embodiments, the remote 102 may include two parts, a first part connected via a physical connection to the camera and a second part that can detect gesture, the first and second parts may each include wireless devices that allow for them to wirelessly communicate with each other. Particularly, in one example, the first part may be connected to a camera trigger input of the camera and include a wireless transceiver that communicates with a wireless transceiver of the second part. The second part may include a processor, sensor, or other devices to detect gestures. In this way, the second part may communicate with the camera 101 via the first part. In some embodiments, the remote 102 may be integrated directly with the camera 101 via a direct mechanical and electrical connection.

The remote 102 includes a processor 120, a first proximity sensor 121a, and a second proximity sensor 121b. The first and second proximity sensors 121a and 121b are communicably coupled to the processor 120. In some embodiments, the remote 102 may include more or fewer proximity sensors. In some embodiments, the remote 102 also includes an indication light 122. In some embodiments, the indication light 122 is a light emitting diode (LED) communicably coupled to the processor 120 and configured to illuminate in one or more colors. The indication light 122 may be positioned within a housing of the remote such that a user of the remote 102 can see the light illuminate when the processor 120 causes the light to illuminate.

The processor 120 may be a microprocessor, a processor shared with the camera, a programmable logic controller (PLC) or any other type of processing device. In some embodiments, the first and second proximity sensors 121a and 121b are mechanically and electrically connected to a pin on the processor 120. In some embodiments, the processor 120 may be implemented as an Adafruit Trinket M0 Microcontroller. The remote 102 includes a power supply. In an exemplary embodiment, the power supply is a chargeable battery (not depicted) that is electrically connected to the processor. In some embodiments, the remote 102 includes a camera interface. In some embodiments, the camera interface includes 3.5 mm stereo barrel jack that is communicably coupled to the processor 120. In some embodiments, the remote includes an on/off switch that is configured to turn off the processor 120. The on/off switch (not depicted) may disconnect the processor 120 from power or may signal to the processor 120 to enter into a sleep mode.

The first and second proximity sensors 121a and 121b are communicably coupled to the processor 120 and configured to monitor an environment external to the remote for gestures. That is, the first and second proximity sensors 121*a* and 121*b* are positioned within the remote to monitor the external environment. In some embodiments, the first proximity sensor 121*a* of the at least one proximity sensors 121*a-b* is positioned to monitor a first portion (e.g., above the remote) of the external environment and the second proximity sensor 121*b* is position to monitor a second portion (e.g., to a side of the remote) of the external environment. In one example, a first gesture is sensed by the first proximity sensor 121*a* when an object is sensed in the external environment at a first proximity. In some embodiments, the first proximity is the object sensed at a first distance in the first portion of the external environment. In another example, a second gesture is sensed by the first proximity sensor 121*a* when an object is sensed in the external environment at a second proximity in the first portion of the external environment. In some embodiments, the second proximity is the object sensed at a first distance from the first proximity sensor 121*a*. In some embodiments, another gesture may be sensed by a second proximity sensor 121*b*. In some embodiments, the at least one proximity sensor 121*a-b* is an infrared sensor. In some embodiments, the at least one proximity sensor 121*a-b* is implemented using TCRT5000 infrared proximity sensors. In other embodiments, other varieties of proximity sensors may be used such as capacitive, magnetic, electromagnetic induction, infrared, or a combination thereof. In some embodiments, each proximity sensor may include one or more cameras, light detection and ranging (LIDAR) systems, and/or radar systems. In some embodiments, the proximity sensors 121*a-b* sense the gestures and transmit the sensed information to the processor 120 for processing. The processor 120 may then determine whether a gesture was sensed based off the output of the first or second proximity sensors 121*a* and 121*b*. The processor 120 then may generate a pre-determined output signal in response to the gesture.

Figure 2:
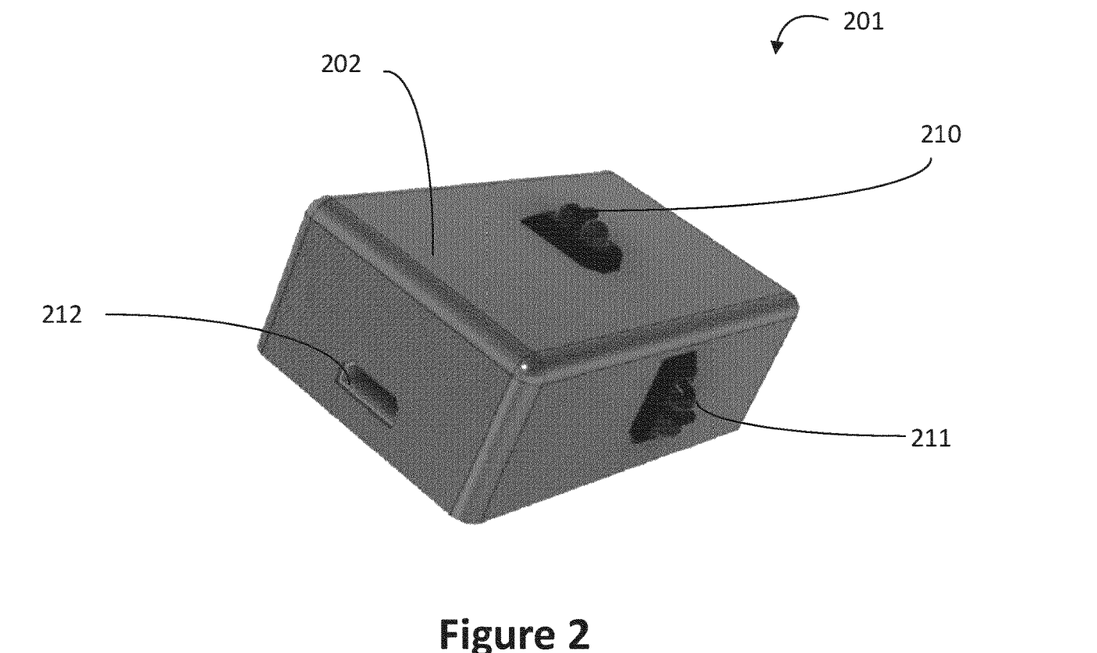
FIG. 2 depicts a first isometric view of a remote for controlling a camera in accordance with an illustrative embodiment.
Figure 3:
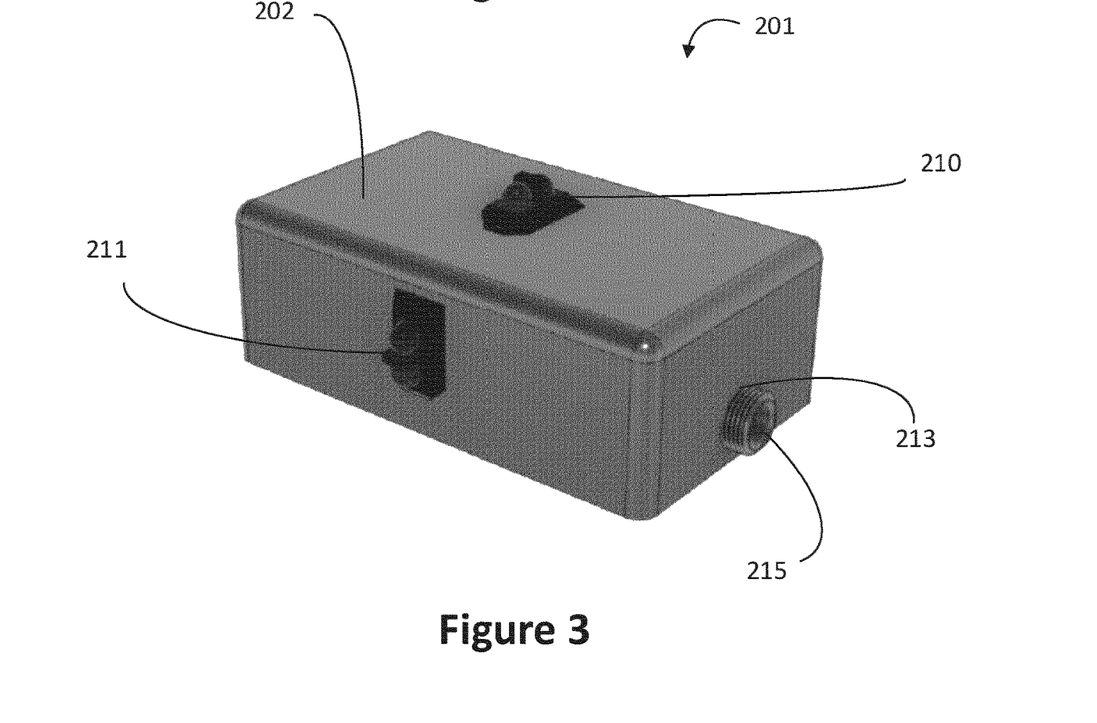
FIG. 3 depicts a second isometric view of the remote of FIG. 2.
Figure 4:
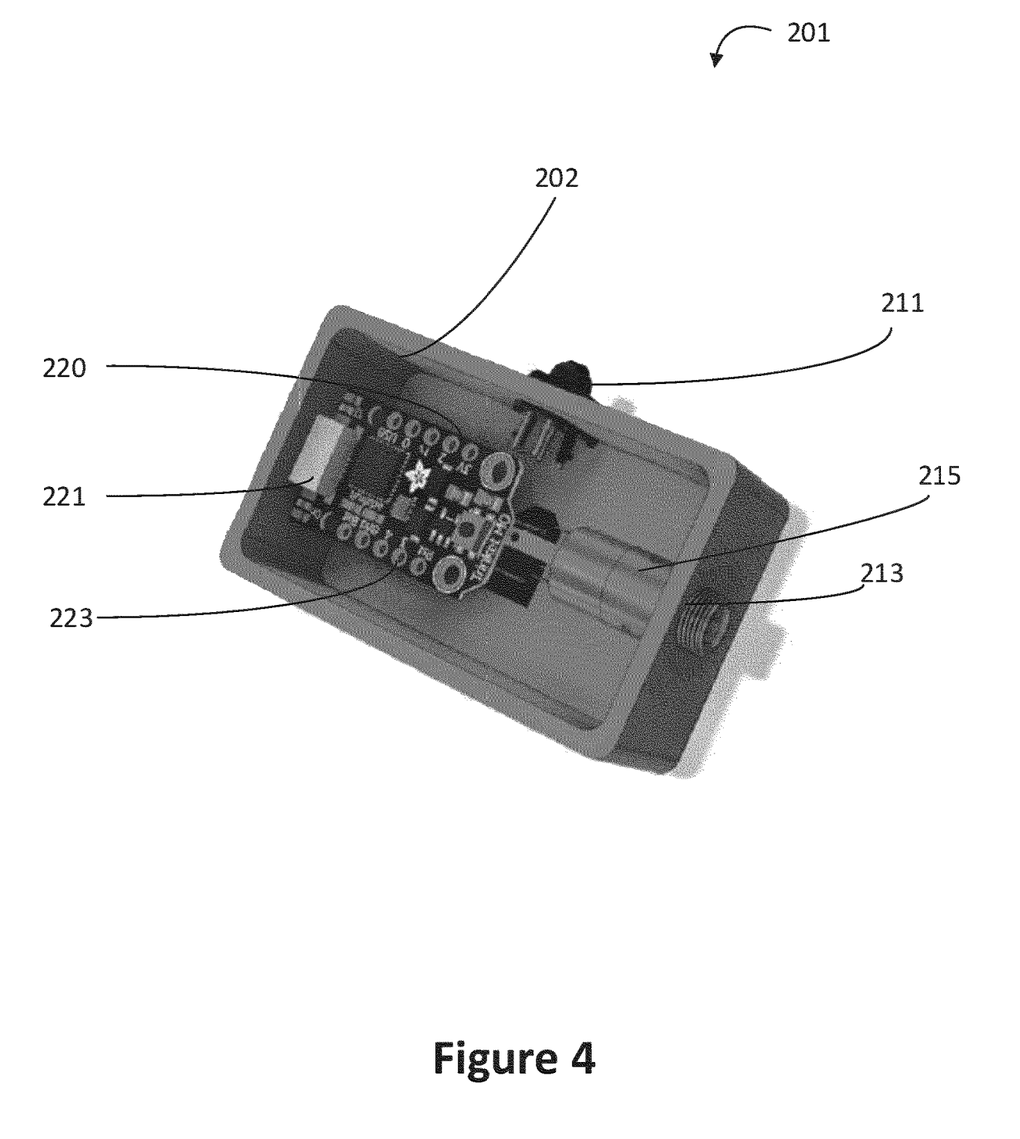
FIG. 4 depicts an isometric view of the remote of FIG. 2 with a cover removed.

Referring to FIGS. 2-4, a remote 201 is illustrated according to an exemplary embodiment. The remote 201 includes a housing 202 and a first proximity sensor 210 mounted on a first side of the housing 202. The 201 remote includes a second proximity sensor 211 mounted on a second side of the housing 202. In alternative embodiments, the remote 201 may only include one proximity sensor that is able to detect multiple gestures. The first proximity sensor 210 and the second proximity sensor 211 are positioned on different sides such that the sensors are directed in different directions and monitor different portions of the environment external to the housing 202. The housing 202 may be comprised of aluminum, steel, plastic, or a combination thereof. The housing 202 may be implemented in a box shape, circular shape, or other shape that allows for the proximity sensors to be mounted to or within and stabilized such that the proximity sensors 210 and 211 may monitor the environment external to the housing.

Referring generally to FIG. 2*a* now, the housing 202 may include a first port 212. The first port 212 may be a universal serial bus (USB) port that allows for a USB cord to be connected to a USB interface of a processor disposed within the housing. Referring generally to the FIG. 2*b* now, the housing 202 may include a second port 213. The second port 213 may be an opening in the housing 202 that allows for a camera interface 215 to be mounted therein. In some embodiments, the camera interface 215 is a 3.5 millimeter (mm) stereo barrel jack. In other embodiments, the camera interface 215 may include an antenna if wireless or other types communication ports if wired. The camera interface 215 is connected to the processor within the housing 202 and the second port 213 may provide mechanical support to the camera interface 215. It is to be appreciated that the remote 201 is not limited by the first port 212, the second port 213, or the type of camera interface 215.

The remote 201 includes the housing 202 and a processor 220 disposed within the housing 202. In an embodiments, the processor 220 includes a USB interface 221. The USB interface 221 may allow for the processor 220 to be programmed. For example, a user may connect to the processor 220 via the USB interface 221 a re-program the processor 220 such that the processor 220 can determine (e.g., look for) different types of gestures as described herein. The processor 220 also includes the camera interface 215. The processor 220 is able to generate a signal (e.g., in accordance with the processors 220 programming) in response to determining that a proximity sensor 211 or 210 has sensed a relevant gesture and transmit the signal to the camera via the camera interface 215. The processor 120 also includes a plurality of input/output pins 223. The input/output pins 223 electrically and mechanically connect to the camera interface 215, the proximity sensors 210 and/or 211, and the USB interface 221.

Figure 5:
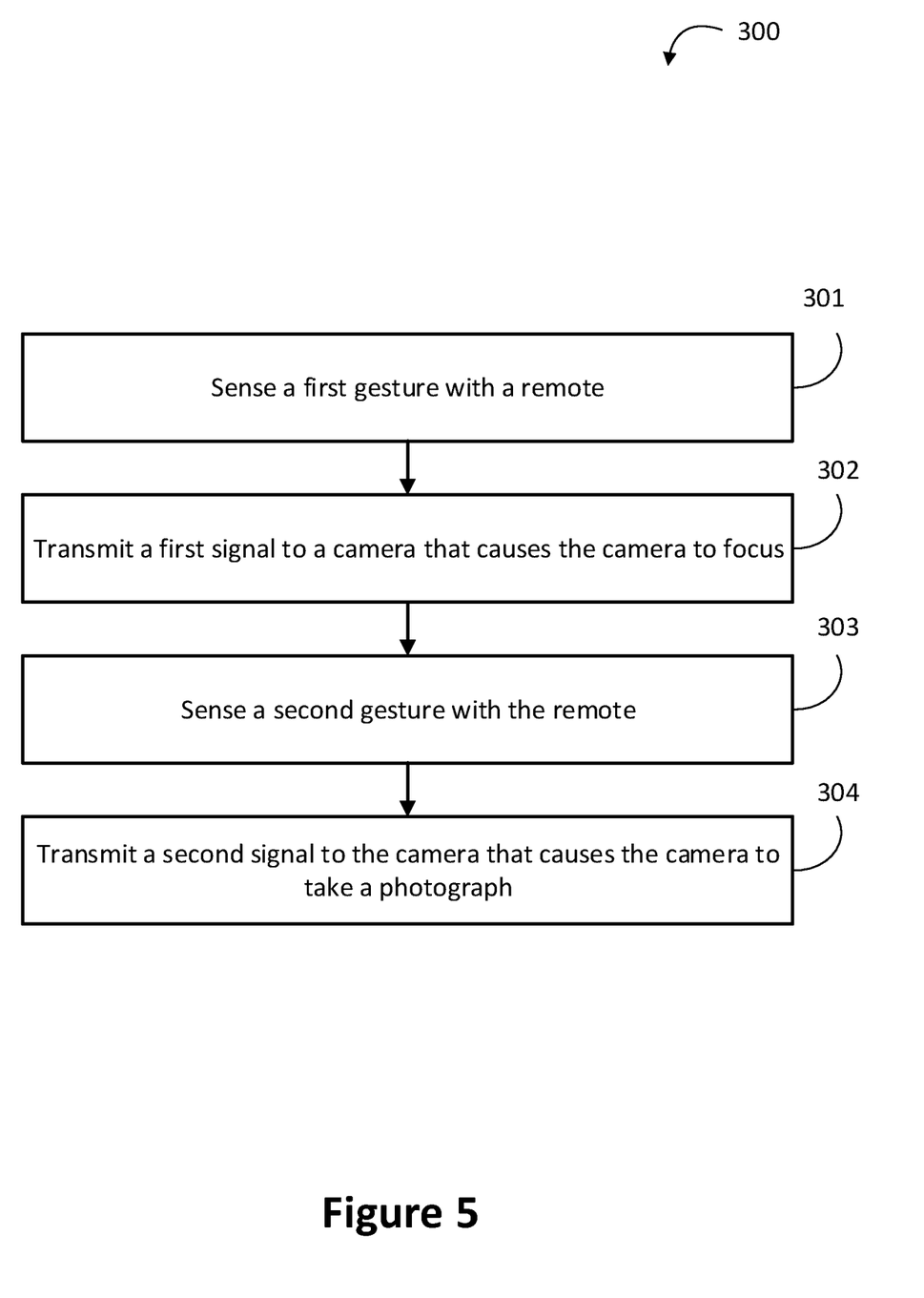
FIG. 5 depicts a flow diagram for controlling a camera in accordance with an illustrative embodiment.

FIG. 3 depicts a flow diagram for controlling a camera in accordance with an illustrative embodiment. At process 301, the remote senses a first gesture. The first gesture is a touchless gesture. That is, the remote sensed the first gesture without any physical contact between the remote and any object. In some embodiments, the remote senses the first gesture by sensing an object at a first proximity by a first proximity sensor. In some embodiments, the first proximity is the object at a first distance from the first proximity sensor. The object may be a hand of a user, a foot of the user, a glove, a utensil, or any other device or material controlled by the user. In some embodiments, a processor of the remote receives a signal from the first proximity sensor that indicates that the first proximity sensor has sensed the first gesture. In some embodiments, the processor receives a signal from the first proximity sensor and the processor then determines that the first proximity sensor has sensed the first gesture. That is, the first proximity sensor may output an analog or digital signal to the processor that is based on the sensed position of the object. In response, the processor may determine whether the first gesture was sensed.

At process 302, in response to determining that the first gesture was sensed, the remote transmits a first signal to a camera. The first signal is configured to cause the camera to focus the camera's lens system on the FOV of the camera. The exact electronic configuration of the first signal (e.g., the protocol) is dependent upon the type of camera being used and the particular camera interface being implemented. That is, the processor in response to determining that the first gesture was sensed generates the first signal in accordance with a protocol associated with the camera interface and transmits the first signal to the camera via the camera interface.

In some embodiments, the camera may focus in response to receiving the first signal and transmit a signal back to the remote that indicates to the camera has focused. In response to receiving the signal indicative that the camera is focused, the processor may illuminate an indication light on the remote to indicate to a user that the camera is focused. In some embodiments, the indication light is illuminated in red because red has the least effect on photographs. In some embodiments, the indication light was illuminated in a second color before the camera was focused. The second color may indicate to the user that the camera is on, but not focused. In some embodiments, the second color is green.

At process 303, the remote senses a second gesture. The second gesture may be a touchless gesture. That is, the remote may sense the second gesture without any contact between the remote and an object. In some embodiments, the second gesture may be a light touch between the proximity sensor and the object. In some embodiments, the remote senses the second gesture by sensing the object at a second proximity by the first proximity sensor. In some embodiments, the second proximity is the object at a second distance from the first proximity sensor. Alternatively, the remote may sense the second gesture by sensing the object at a second proximity by a second proximity sensor. The second proximity may be the object positioned at a third distance from the second proximity sensor. In some embodiments, the object sensed in the first gesture is the same object sensed in the second gesture. In some embodiments, the object sensed in the first gesture is different than the object sensed in the second gesture. The object may be a hand of a user, a foot of the user, a glove, a utensil, a feather, or any other device or material controlled by the user. In some embodiments, a processor of the remote receives a signal representing the sensed second proximity indicates that the second gesture has been sensed. In some embodiments, the processor receives the signal representing the sensed second proximity from one of the proximity sensors and the processor then determines that the first proximity sensor has sensed the second gesture. That is, the proximity sensors may output an analog or digital signal to the processor that is based on the sensed position (e.g., proximity) of the object. In response, the processor may determine whether the second gesture was sensed.

At process 304, in response to determining that the second gesture was sensed, the remote transmits a second signal to a camera. The second signal is configured to cause the camera to take the photograph. In some embodiments, the remote turns off any light on the remote before the transmitting the second signal. Turning off any light ensures that the quality of the resulting photograph is not interfered with. The second signal is received by the camera and takes the photograph. In some embodiments, there is a flash from a flash system of the camera or a click from the camera that indicates to the user that the photograph has been taken. In some embodiments, the camera sends a fourth signal back to the remote after the photograph has been taken. The fourth signal may be received at the processor of the remote, and in response to receiving the fourth signal, the remote may re-illuminate the light.

Figure 6:
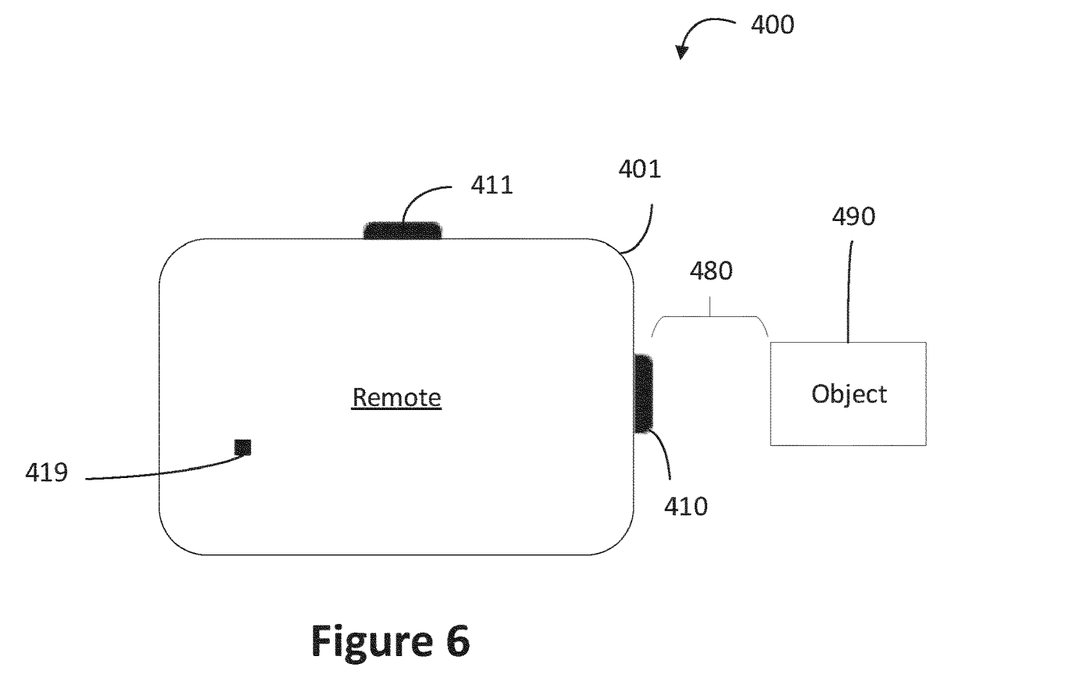
FIGS. 6 and 7 depict a first and a second gesture in accordance with an illustrative embodiment.
Figure 7:
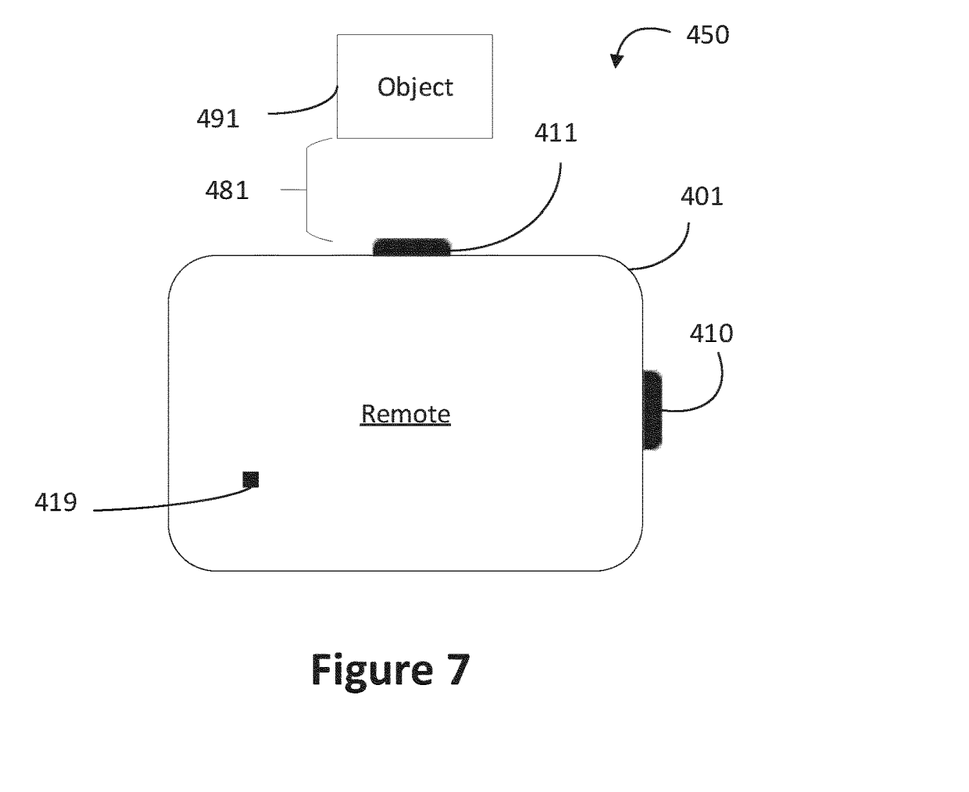

FIGS. 6 and 7 depict a first and a second gesture in accordance with an illustrative embodiment. FIG. 6 depicts an example of a remote 401 sensing a first gesture 400. In this example, object 490 is at a first distance 480 from a first proximity sensor 410 of the remote 401. The first proximity sensor 410 senses the object 490 at the first distance 480 and outputs a signal indicative of the position of the object to a processor (not depicted) of the remote 401. The signal indicative of the position may then be processed by the by processor such that the remote 401 determines that a first gesture has been sensed.

FIG. 7 depicts an example of the remote 401 sensing a second gesture 450. In this example, object 490 is at a second distance 481 from a second proximity sensor 411 of the remote 401. The second proximity sensor 411 senses the object 490 at the second distance 481 and outputs a signal indicative of the position of the object 490 to a processor (not depicted) of the remote 401. The signal indicative of the position may then be processed by the by processor such that the remote 401 determines that the second gesture 450 has been sensed.

In some embodiments, the object 490 sensed in the second gesture 450 is the same as the object 490 sensed in the first gesture. In some embodiments, the object 490 sensed in the second gesture 450 is different than the object 490 sensed in the first gesture 400. The object 490 may include a hand, foot, other body extremity, or device controlled by a user. In some embodiments, the first distance 480 and the second distance 481 are the same magnitudes. In some embodiments, the first distance 480 and the second distance 481 are different magnitudes.

In an example operation, a camera may be mounted to stand. The user then places a first item within a field of view of the camera and motions a first gesture to the remote (e.g., as referenced in FIG. 6) by motioning an object to the distance 480 from the first proximity sensor 410. In response to the first gesture, the remote 401 signals to the camera and causes the camera to focus. Once the camera is focused an indication light 419 may illuminate based on feedback from the camera that signals to the user that the camera is focused. The user then motions a second gesture (e.g., as referenced in FIG. 6) by moving the object to the second distance 481 from the second proximity sensor 411, which causes the remote 401 to turn off the indication light 419 and transmit a signal to the camera that causes the camera to take a photograph. The camera captures the image of the first item and the user may then remove the first item from the field of view of the camera and places a second item in the field of view. In this way, the remote provides a reliable and efficient way of archiving items with photography.

Figure 8:
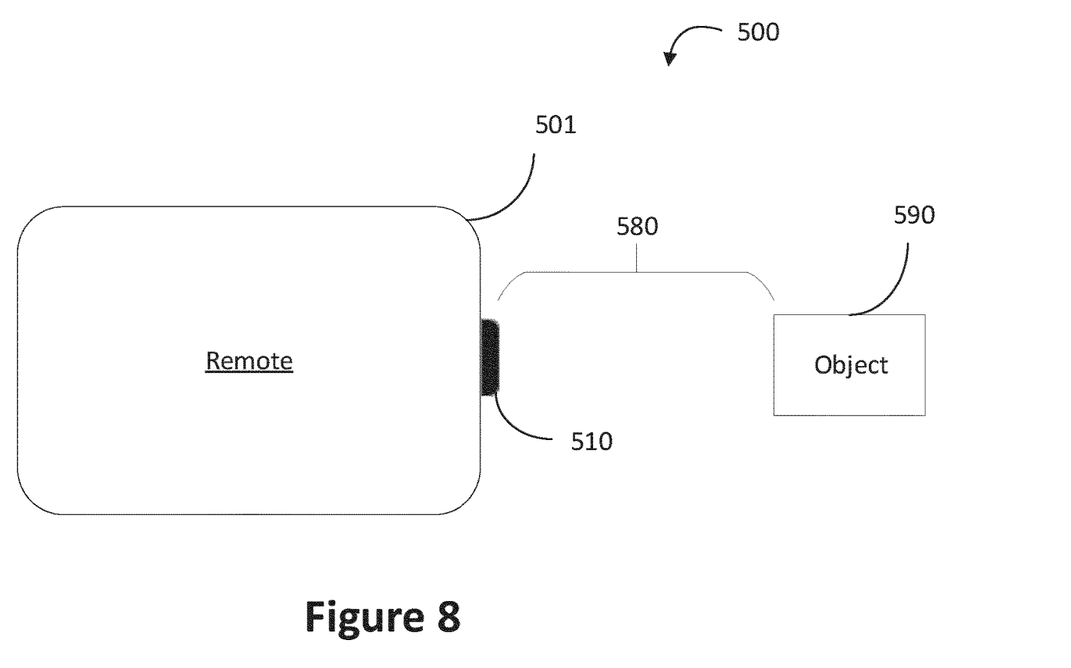
FIGS. 8 and 9 depict a first and a second gesture in accordance with an illustrative embodiment.
Figure 9:
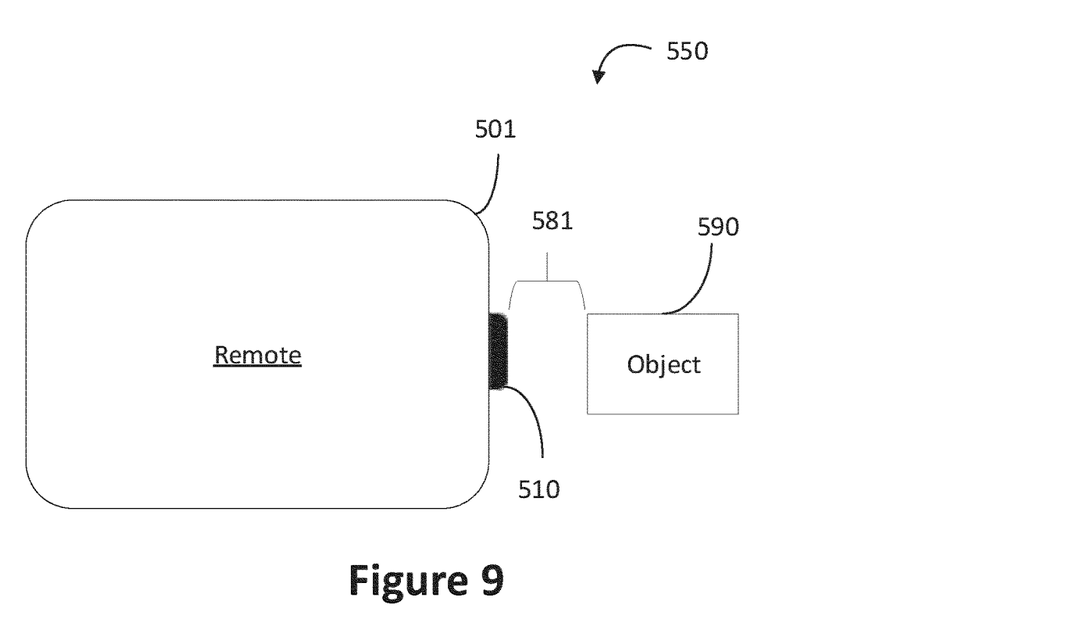

FIGS. 8 and 9 depict a first and a second gesture in accordance with an illustrative embodiment. FIG. 5a depicts an example of a remote 501 sensing a first gesture 500. In this example, object 590 is at a first distance 580 from a first proximity sensor 510 of the remote 501. The first proximity sensor 510 senses the object 590 at the first distance 580 and outputs a signal indicative of the position of the object 590 to a processor (not depicted) of the remote 501. The signal indicative of the position may then be processed by the by processor such that the remote 501 determines that the first gesture 500 has been sensed.

FIG. 9 depicts an example of the remote 501 sensing a second gesture 550. In this example, object 490 is at a second distance 581 from the first proximity sensor 510. The first proximity sensor 510 senses the object 590 at the second distance 581 and outputs a signal indicative of the position of the object 590 to a processor (not depicted) of the remote 501. The signal indicative of the position may then be processed by the by processor such that the remote 501 determines that the first gesture 500 has been sensed. In some embodiments, the first distance 580 and the second distance 581 are different magnitudes. In some embodiments, the first distance 580 is less than the second distance 581. In some embodiments, the first distance is greater than the second distance 581. It is to be appreciated that FIGS. 4a-b and FIGS. 5a-b are merely representative examples of particular embodiments. That is, in alternative embodiments, the first and second gestures may include movement of the object, or any relative positioning of the object that can be sensed by the proximity sensors.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the remote and camera as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A system for taking a photograph comprising:
a camera;
a remote communicably coupled to the camera, the remote comprising:
a micro-processor; and
a proximity sensor connected to the micro-processor; and
an indication light communicably coupled to the micro-processor;
wherein the indication light is configured to illuminate in a first color in response to receiving a first signal indicating the camera is on, and illuminate in a second color in response to receiving a second signal indicating the camera is focused;
wherein the remote is configured to focus the camera in response to sensing a first gesture and to cause the indication light to turn off and the camera to take a photo in response to sensing a second gesture, and wherein the first gesture and second gesture are touchless and sensing the first gesture comprises sensing an object at a first proximity by the proximity sensor.

2. The system of claim 1, wherein sensing the second gesture comprises sensing the object at a second proximity from the proximity sensor that is less than the first proximity.

3. The system of claim 2, wherein the object is a hand or a foot of a user.

4. The system of claim 1, wherein the remote further comprises a second proximity sensor communicably coupled to the micro-processor, the second proximity sensor positioned in a different direction than the proximity sensor.

5. The system of claim 4, wherein sensing the second gesture comprises sensing the object at a second proximity by the second proximity sensor.

6. The system of claim 1, wherein the first color is green, and the second color is red.

7. The system of claim 1, wherein the indication light is further configured to re-illuminate in the first color in response to the photograph being taken.

8. A remote for controlling a camera comprising:
a micro-processor; and
a proximity sensor connected to the micro-processor; and
an indication light communicably coupled to the micro-processor;
wherein the indication light is configured to illuminate in a first color in response to receiving a first signal indicating the camera is focused; and
wherein the remote is configured to cause the camera to focus in response to sensing a first gesture and to cause the indication light to turn off and the camera to take a photograph in response to sensing a second gesture, and wherein the first gesture is touchless and sensing the first gesture comprises sensing an object at a first proximity by the proximity sensor.

9. The remote of claim 8, wherein sensing the second gesture comprises sensing the object at a second proximity by the proximity sensor.

10. The remote of claim 9, wherein the object is a hand or a foot of a user.

11. The remote of claim 8, the remote further comprising a second proximity sensor communicably coupled to the micro-processor, the second proximity sensor positioned in a different direction than the proximity sensor.

12. The remote of claim 11, wherein sensing the second gesture comprises sensing the object at a second proximity by the second proximity sensor.

13. The remote of claim 8, wherein the indication light is configured to illuminate in a second color in response to the camera being on.

14. The remote of claim 13, wherein the second color is green.

15. The remote of claim 13, wherein the indication light is further configured to re-illuminate in the second color in response to the photograph being taken.

16. A method of taking a photograph comprising:
sensing, by a remote, a first gesture, wherein the first gesture is touchless and sensing the first gesture comprises sensing an object at a first proximity by a first proximity sensor;
transmitting, by the remote, a first signal to a camera, the first signal configured to cause the camera to focus;
in response to receiving, by the remote, a second signal from the camera, illuminating an indication light in a first color, wherein the second signal is indicative that the camera is focused;
sensing, by the remote, a second gesture; and
in response to sensing the second gesture, turning off the indication light transmitting, by the remote, a third signal to the camera, the third signal configured to cause the camera to take the photograph.

17. The method of claim 16, wherein sensing the second gesture comprising sensing the object at a second proximity by the first proximity sensor.

18. The method of claim 17, wherein the first proximity comprises the object at a first distance from the first proximity sensor, the second proximity comprises the object at a second distance from the first proximity sensor, and the second distance is less than the first distance.

19. The method of claim 16, wherein sensing the second gesture comprises sensing the object at a second proximity by a second proximity sensor.

20. The method of claim 16, further comprising:
in response to receiving, by the remote, a fourth signal from the camera, illuminating the indication light in the first color, wherein the fourth signal is indicative that the photograph was taken.

* * * * *